Dec. 17, 1946. R. S. HUNTER 2,412,616
SIGNALING MIRROR
Filed April 20, 1945 2 Sheets-Sheet 1
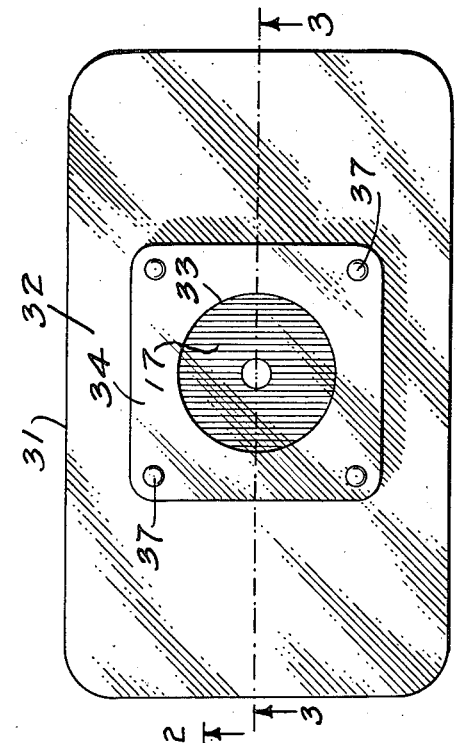
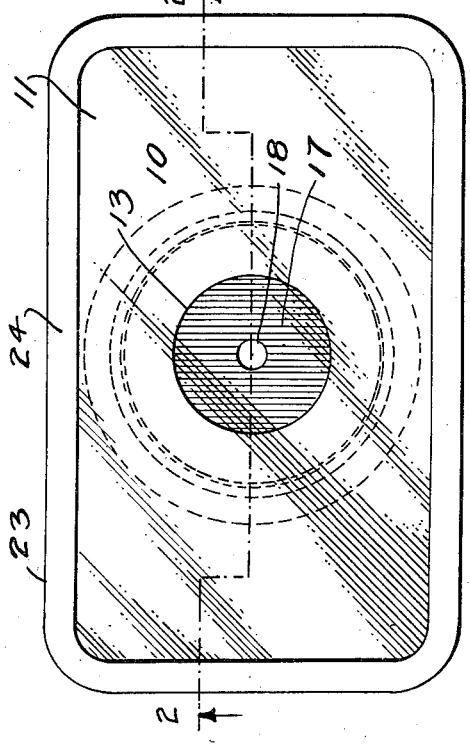
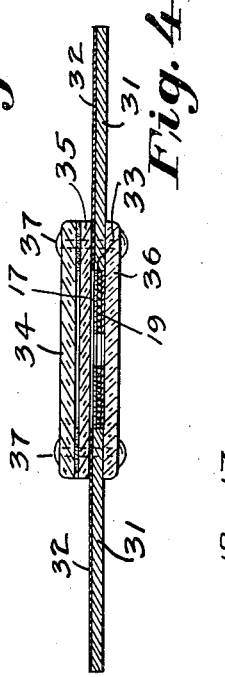
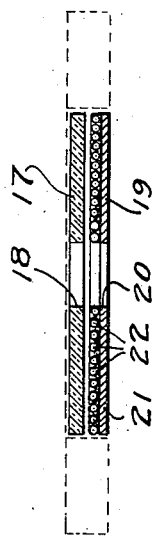
INVENTOR
RICHARD S. HUNTER
BY
ATTORNEY

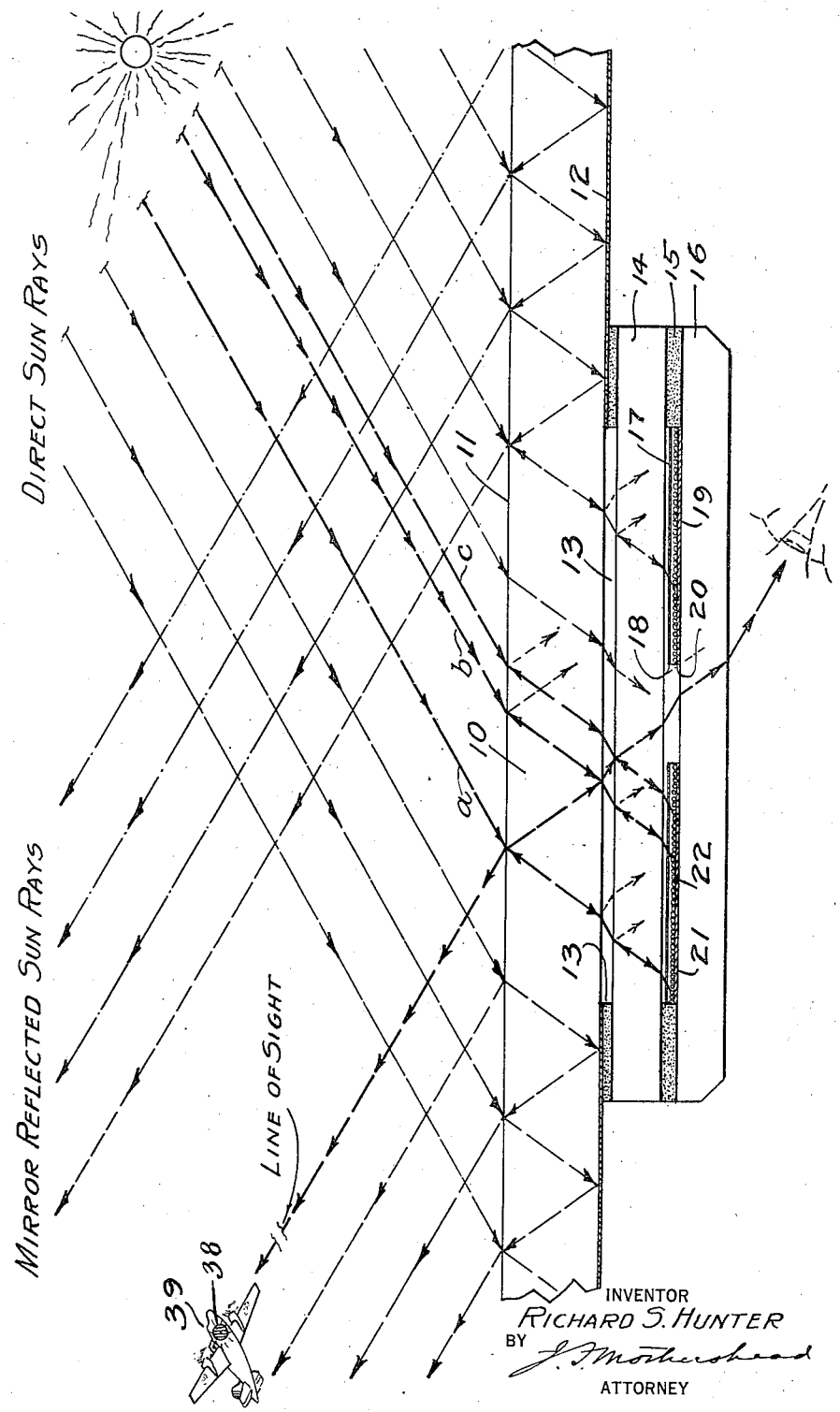

Patented Dec. 17, 1946

2,412,616

UNITED STATES PATENT OFFICE 2,412,616

SIGNALING MIRROR

Richard S. Hunter, Franklin Park, Va., assignor to United States of America, as represented by the Secretary of Commerce Application April 20, 1945, Serial No. 589,451

5 Claims. (Cl. 116—20)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

My invention relates to heliographic means for sending distress signals to passing aircraft or watercraft and particularly to one which may be quickly and accurately aimed, and has a relatively wide angular range.

In the accompanying drawings:

Figure 1 is a plan view of my signaling mirror.

Fig. 2 is a cross section on the line 2—2 of Figure 1.

Figure 3 is a plan view of a polished metal modification.

Figure 4 is a section on the line 3—3 of Figure 3.

Figure 5 is an enlarged detail of a portion of Figure 2 showing the arrangement of my filter and retrodirective reflector.

Figure 6 is an enlarged diagrammatic view showing the application of the device when signaling an airplane.

In my signaling mirror illustrated in Figures 1 and 2:

A mirror 10 made of tempered glass, transparent plastic or the like transparent refractive material, has an upper surface 11 and a metallic mirror coating 12, and is provided with a suitable window 13 formed by the omission of a selected portion of the coating 12. Under the window 13 is a transparent refractive layer 14, preferably a disk of clear plastic marginally cemented to the mirror, but optically separated from the window portion of the mirror. A spacing washer 15 is cemented between the disk 14 and a second disk 16 of clear refractive plastic. Within the washer 15 and between the disk 14 and the second disk 16 are confined a thin, preferably red color filter 17 having a sighting aperture 18 and a disk 19 provided with a sighting aperture 20. The disk 19 possesses a high-angularity retrodirective reflecting surface formed by a layer of very small spheres 22 embedded in very thin flexible material 21 (see Figure 5).

My device is protected by a suitable casing 23 of plastic or the like, having an inturned marginal flange 24 which engages the mirror and an annular flange 23 which covers and protects the margin of the disk 16. Besides protecting my signaling device from rough handling the casing 23 provides an additional means for excluding moisture.

In Figures 3 and 4 there is illustrated a modification in which the reflecting element is a metal plate 31, provided with a polished mirrored surface 32 and a window 33. The window 33 is covered by two disks of transparent light refractive plastic 34 and 35 which are slightly separated as by a marginal layer of cement but are optically independent.

A third disk of transparent plastic material 36 is placed against the underside of the plate 31. A filter 17 and a reflecting disk 19 are placed within the window 33 and by means of a plurality of rivets 37 the disks 34, 35 and 36 are rigidly secured to the plate 31.

The application of my device for signaling is diagrammatically illustrated in Figure 6. In this figure are shown by broken lines the direct rays of the sun from the right which are reflected from the mirrored surface 12 and also from the upper surface 11 of the mirror 10.

Accuracy and speed in aiming my mirror are essential to the sending of a distress signal. For the purpose of aiming, certain rays are diverted through the window 13 and sighting apertures 18 and 20 to the eye of a person sending the signal. For the purpose of illustration, the courses of three arbitrarily selected rays, designated a, b and c are indicated by heavy broken lines (Figure 6). A portion of the ray b upon striking the upper surface 11 of the mirror is refracted as it passes downwardly and is again refracted as it passes out through the window 13. It is similarly refracted by the layer 14, and passes through the color filter 17 to one of the tiny spheres 22. Each embedded sphere has the property of reversing the direction of a ray which strikes it. The retro-reflected ray, colored by passing twice through the filter 17, is split into two portions upon reaching the upper surface of the layer 14, one portion being reflected to the right and being lost because it strikes the disk 19. Another portion of this colored ray is reflected to the right by the under surface of the mirror 10, within the window 13, and is reflected downwardly to the right through the sighting apertures 18 and 20 to the eye of the person sending a signal. The ray c follows courses parallel to those of the ray b as far as the upper surface of the disk 14 where it is reflected downwardly through the sighting openings 18 and 20 along the line of the ray b, thus intensifying the brilliance of this ray. Similarly, the ray a follows courses parallel to the rays b and c to the surface 11 of the mirror 10 where it is reflected downwardly to the right and joins the reflected rays b and c, thus further intensifying this ray. A plurality of rays following paths parallel to $a$, $b$, and $c$ also pass through the apertures 18 and 20 to the eye of a signaler who sees a glowing red spot which appears to him to be in space. The red spot is in reality a virtual red image of the sun diagrammatically indicated by the numeral 38 and when he succeeds in aligning this virtual image 38 with an aircraft 39, the white light reflected from the mirror will be directed upon the craft in the endeavor to attract the attention of the crew.

Similarly, it is possible, if a still brighter red spot is desired, to insert additional transparent refractive layers in front of the retrodirective surface which will reflect additional red rays back through the sighting apertures.

Because moisture would interfere with the sighting of my mirror, precautions are taken to seal all external joints both between my mirror 10 and the casing 23 and between the transparent members.

While I have shown and described certain embodiments of my invention, it is to be understood that it is capable of many modifications, changes, therefore in the construction and arrangement may be made without departing from the spirit and scope of the invention as disclosed in the appended claims, in which it is my intention to claim all novelty inherent in my invention as broadly as possible in view of the prior art.

What I claim is:

1. A signaling device comprising a mirror provided with a window, a transparent optically separate layer covering said window, a high angularity retrodirective reflective sheet provided with a sighting opening covering said layer and a transparent protecting layer confining said film against said first transparent layer.

2. A signaling mirror provided with a window, a transparent refractive layer mounted over said window, an apertured colored filter and a high angularity retrodirective reflective sheet provided with an aligned opening covering said layer, and a second transparent protecting layer marginally united to and confining said sheet against said first transparent layer.

3. A signaling device as defined in claim 2 having the first of said transparent refractive layers united at its margins to the mirror and to said second transparent layer.

4. In a heliographic signaling device comprising a mirror provided with a window, a retrodirective reflecting sheet provided with a sighting aperture, a color filter provided with an aligned aperture and a protective transparent refractive layer, and a second transparent refractive layer between said mirror window and said sheet confining but not optically united to said sheet.

5. A heliographic signaling device comprising an opaque mirror provided with a window, a retrodirective reflecting sheet provided with a sighting aperture and a color filter provided with an aligned sighting aperture within the window of said mirror, a clear transparent disk beneath said window and extending beyond the margins thereof, two similar transparent optically independent disks above said window and means for rigidly uniting said disks to said mirror.

RICHARD S. HUNTER.